United States Patent

Araki et al.

[11] Patent Number: 5,837,402
[45] Date of Patent: Nov. 17, 1998

[54] ZINC POWDERS FOR USE IN BATTERIES AND A SECONDARY ALKALINE ZINC BATTERY USING SAID ZINC POWDERS

[75] Inventors: Kiyoshi Araki; Masamitsu Kaga; Toshiya Kitamura; Makiko Yanagisawa; Fumihiro Sato, all of Tokyo, Japan

[73] Assignee: Dowa Mining Co., Ltd., Tokyo, Japan

[21] Appl. No.: 769,768

[22] Filed: Dec. 19, 1996

[30] Foreign Application Priority Data

Dec. 21, 1995  [JP]  Japan ................................... 7-349701
Nov. 13, 1996  [JP]  Japan ................................... 8-316944
Dec. 3, 1996  [JP]  Japan ................................... 8-337645

[51] Int. Cl.$^6$ .................................................. H01M 4/42
[52] U.S. Cl. ........................... 429/229; 429/206; 428/570
[58] Field of Search ............................ 428/570; 429/229, 429/230, 206

[56] References Cited

U.S. PATENT DOCUMENTS

| 5,139,900 | 8/1992 | Tada et al. | 429/229 X |
| 5,168,018 | 12/1992 | Yoshizawa et al. | 429/206 X |
| 5,198,315 | 3/1993 | Tada et al. | 429/229 X |
| 5,296,267 | 3/1994 | Tada et al. | 428/570 X |

*Primary Examiner*—Stephen Kalafut
*Attorney, Agent, or Firm*—Frishauf, Holtz, Goodman, Langer & Chick, P.C.

[57] ABSTRACT

Zinc powder comprising particles having part or all of their surfaces coated either with copper and/or indium or with silver is used as a battery material or an active material for the negative electrode in a battery. The powder can be used as an anode active material in a secondary battery to achieve a higher discharge capacity and better cycle characteristics.

16 Claims, 2 Drawing Sheets

ZINC POWDERS FOR USE IN BATTERIES AND A SECONDARY ALKALINE ZINC BATTERY USING SAID ZINC POWDERS

BACKGROUND OF THE INVENTION

This invention relates to a zinc powder for use with batteries that has part or all of the particle surfaces coated either with indium and/or copper or with silver. The invention also relates to a secondary alkaline zinc battery using such zinc powder as the negative electrode material. More specifically, the invention relates to a secondary alkaline zinc battery having an improved lifetime characteristic in terms of charge-discharge cycle number.

Zinc electrodes for secondary alkaline zinc batteries are fabricated by several methods including the sheet method in which the powder of elemental zinc or zinc oxide is mixed with a binder resin and the mix is shaped into a sheet form, which is compressed onto a current collector made of either silver or copper, and the paste method in which a paste prepared by mixing the zinc or zinc oxide powder with an organic binder is spread over the current collector. In either method, the current collector is in the form of a grid such as one made of expanded silver or copper sheet to which a pasty active material of Zn or ZnO is pressed to form a secondary battery and, hence, the active material located far from the current collector is not effectively supplied with an electric current, thus causing nonuniform cell reactions. As a result, the following two major drawbacks have occurred: (1) the utilization of the secondary battery is low enough to provide a small discharge capacity; and (2) dendrite formation and a shape change will cause only poor cycling characteristics.

Recent efforts to reduce the size of various machines and equipment while enhancing their performance and making them easier to carry and use by individual operators have raised the need to develop small and yet high-capacity batteries that can be used as power sources. In order to meet this requirement, studies are being made on secondary batteries that use zinc of high energy density and economy as the active material for a negative electrode. A problem with secondary zinc batteries that involve a dissolution reaction is that as a result of repeated charge and discharge, dendrite deposition (during charge), a substantial decrease in the active material and other deleterious phenomena will occur to cause substantial deterioration of the zinc electrode, thereby shortening the battery's cycle life.

A further problem arises form the fact that zinc has a lower electrode potential at equilibrium than the potential for hydrogen evolution; activated zinc which is generated during charge dissolves in the alkaline electrolyte with hydrogen gas evolving. With a view to alleviating this phenomenon, it has been proposed that the cupreous current collector be plated with a metal of high hydrogen overpotential such as tin or lead or a zinc alloy should be made to retard self-discharge, thereby suppressing the evolution of hydrogen gas. However, the first method suffers from the decrease in the active material and it is incapable of controlling the dissolving reaction of zinc at the active material's surface; the second approach is also limited in effectiveness since the surface area of the active material zinc will decrease to cause a drop in capacity. Thus, secondary batteries using the zinc electrode are yet to be commercialized because of their poor cycling characteristics.

SUMMARY OF THE INVENTION

The present invention has been accomplished under these circumstances and has as an object providing a secondary alkaline zinc battery that uses zinc as the active material for a negative electrode and which is retarded in the deterioration of the zinc electrode while exhibiting high utilization and good cycling characteristics.

As a result of the intensive studies conducted to attain stated object, the present inventors found that the battery lifetime in terms of charge-discharge cycle number could be extended by using as the active material for a negative electrode a zinc-containing powder having part or all of the particle surfaces coated either with copper and/or indium or with silver. The present invention has been accomplished on the basis of this finding and allows secondary alkaline zinc batteries of high characteristics to be manufactured at low cost.

The amount of indium, copper or silver to be used for coating zinc particles is preferably in the range of from 0.5 wt % to 10 wt %. If the amount of indium, copper or silver used is less than 0.5 wt %, no substantial improvement will be obtained; if the amount of indium, copper or silver used exceeds 10 wt %, the desired effect will not be obtained also because a thick coating film of indium, copper or silver is formed on the surfaces of zinc particles and the porosity of the coating film is impaired.

When both indium and copper are used at the same time to coat the zinc particles, they should preferably be used in the proportion of indium to copper (In:Cu) of 1:0.1–10, more preferably 1:1–10 and most preferably 1:1–5.

DETAILED DESCRIPTION OF THE INVENTION

Figure 1:
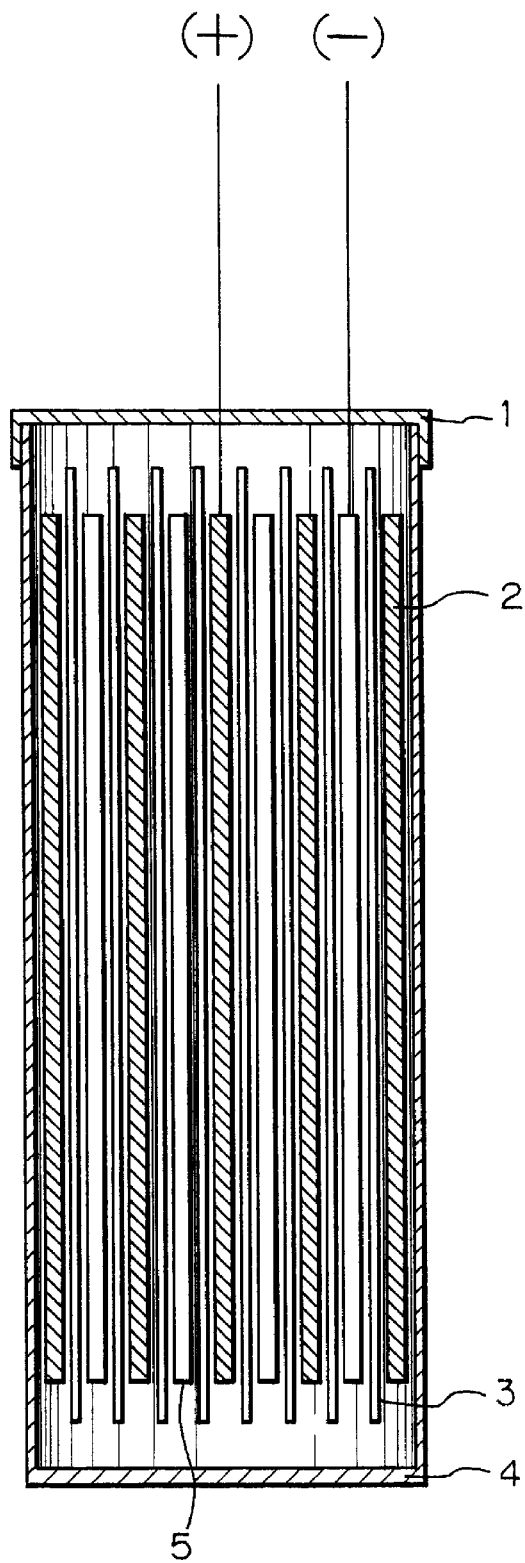
FIG. 1 is a schematic cross section of the sealed secondary alkaline zinc battery fabricated in Example 4 of the invention.

A first aspect of the present invention is a zinc powder for use in batteries that contains at least zinc and which has part or all of the particle surfaces coated either with indium and/or copper or with silver.

A second aspect of the present invention is a secondary alkaline zinc battery using as the active material for a negative electrode a zinc powder that contains at least zinc and which has part or all of the particle surfaces coated either with indium and/or copper or with silver.

A third aspect of the invention is the secondary alkaline zinc battery according to the above mentioned second aspect wherein an indium compound is incorporated in an alkaline electrolyte used in the battery.

A fourth aspect of the invention is a battery material the main component of which is a solids content that is produced by suspending a zinc-containing powder in a solution containing either copper and/or indium ions or silver ions to coat the surface of each particle of zinc with indium and/or copper or silver and then subjecting the suspension to solid-liquid separation.

A fifth aspect of the invention is a secondary alkaline zinc battery using as the active material for a negative electrode a solids content that is produced by suspending a zinc-containing powder in a solution containing either copper and/or indium ions or silver ions to coat the surface of each particle of zinc with indium and/or copper or silver and then subjecting the suspension to solid-liquid separation.

A sixth aspect of the invention is the secondary alkaline zinc battery according to the above mentioned fifth aspect wherein an indium compound is incorporated in an alkaline electrolyte used in the battery.

A seventh aspect of the invention is the zinc powder for use in batteries according to the above mentioned fisrt aspect which consists essentially of zinc particles having part or all of the particle surfaces coated with indium in an amount of 0.5–10 wt % based on the amount of zinc.

An eighth aspect of the invention is the zinc powder for use in batteries according to the above mentioned first aspect which consists essentially of zinc particles having part or all of the particle surfaces coated with copper in an amount of 0.5–10 wt % based on the amount of zinc.

A ninth aspect of the invention is the zinc powder for use in batteries according to the above mentioned first aspect which consists essentially of zinc particles having part or all of the particle surfaces coated with indium and copper, the amount of indium being in the range of 0.5–5 wt % based on the amount of zinc, the amount of copper being in the range of 0.5–5 wt % based on the amount of zinc.

A tenth aspect of the invention is the zinc powder for use in batteries according to the above mentioned ninth aspect wherein the ratio of In to Cu is 1:0.1–10.

An eleventh aspect of the invention is the zinc powder for use in batteries according to the above mentioned tenth aspect wherein the ratio of In to Cu is 1:1–10.

A twelfth aspect of the invention is the zinc powder for use in batteries according to the above mentioned eleventh aspect wherein the ratio of In to Cu is 1:1–5.

A thirteenth aspect of the invention is the zinc powder for use in batteries according to the above mentioned first aspect which consists essentially of zinc particles having part or all of the particle surfaces coated with silver in an amount of 0.5–5 wt % based on the amount of zinc.

When a zinc powder is incorporated in a solution containing copper ions, zinc will dissolve out on the surfaces of its particles while, at the same time, copper is deposited on those surfaces in accordance with the following reaction scheme:

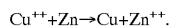

As a result of this reaction, the surfaces of the zinc particles are covered with fine copper grains or the latter will diffuse into the zinc particles, thereby forming a fine and uniform two-phase system that could not be produced by mixing ordinary zinc and copper particles.

Figure 2:
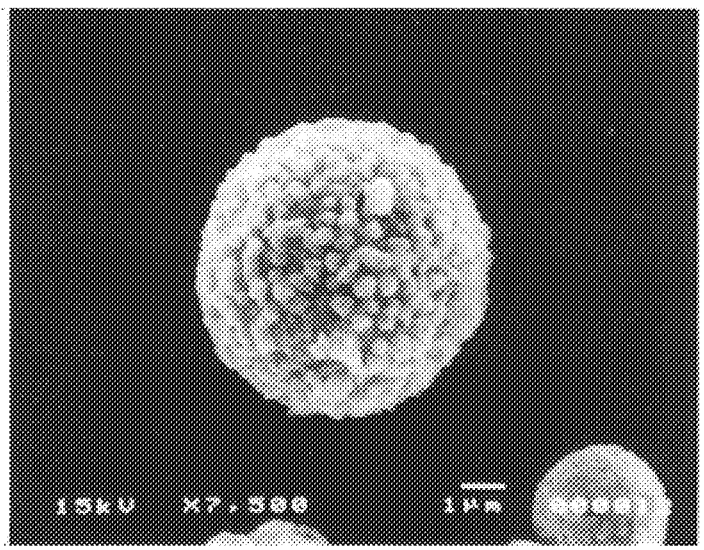
FIG. 2 is a SEM micrograph of a zinc particle coated with 5% of copper.

If the powder mixture in this state is used in the negative electrode, zinc as the active material will engage so intimately with the copper in the current collector that the area of the latter is increased markedly. It should be noted here that even if the surfaces of the particles of the zinc powder are covered with copper, the latter is porous as seen in the SEM micrograph of FIG. 2, and zinc will retain the function of an active material.

The copper which is thusly in intimate engagement with zinc prevents dendrite generation in a secondary battery. In addition, the area over which copper makes contact with zinc is so wide that coupling to the copper which is typically used as a current collector is sufficiently improved to lower the electrical resistance. As a result there will be no marked drop in electrical conductivity and a uniform reaction will proceed in the entire bulk of the active material, which eventually provides for avoidance of the deterioration in the cycle characteristics of the battery. The decrease in electrical resistance offers the added advantage of increasing the discharge capacity.

Equally good results are achievable with zinc powders that are prepared by a vapor-phase synthesis method or an electrolytic method.

Similar results are attained by replacing the copper with indium and the battery's cycling characteristic will be improved although the discharge characteristic is somewhat inferior to the case of using copper. If copper and indium are used in certain proportions, both the discharge and cycling characteristics will be improved. In this case, indium and copper should preferably be used in proportion of indium to copper (In:Cu) of 1:0.1–10, more preferably 1:1–10 and most preferably 1:1–5. Satisfactory results are also attained even if an indium compound is incorporated in the electrolyte. Useful indium compounds include indium hydroxide, indium oxide and indium fluoride, etc.

According to the invention, a zinc powder may be incorporated in a solution containing silver ions; in this case, zinc will dissolve out on the surface of its particles and, at the same time, silver will be deposited on those surfaces, whereby the surfaces of the zinc particles will eventually be covered with silver. The silver thusly covering the surfaces of the zinc particles has a porous structure and hence will retain the function of an active material. It was also discovered that the close network between silver and zinc was effective in retarding dendrite generation during charge on account of the coated silver metal.

In addition, the very wide area of contact between silver and zinc contributes to a smaller electrical resistance. As a result, the cell reactions will proceed in the entire bulk of the uniform active material, thereby preventing a significant drop in electrical conductivity, which contributes to an improvement in battery lifetime in terms of charge and discharge cycles.

It should also be mentioned that the coated zinc powder as defined in the invention is applicable not only to a zinc-nickel hydroxide secondary battery of the type discussed in the Examples that follow but also to secondary batteries of zinc-silver oxide and zinc-air types.

The following examples are provided for the purpose of further illustrating the invention but are in no way to be taken as limiting.

EXAMPLE 1

Eight grams of a zinc powder having an average particle size of 7 μm, as well as water (500 cc) were stirred, with 0.03 N nitric acid (250 cc) being added before stirring the mixture for 3 minutes to etch the zinc particles. Thereafter, a solution (500 cc) of a specified amount of copper nitrate was added to the aqueous solution of the etched zinc powder and the solution was stirred for 6 minutes followed by dewatering. After dewatering, the residue was mixed with a 60% aqueous dispersion of polytetrafluoroethylene (PTFE, 0.7 g). The mix (0.3 g) was pasted to an expanded copper sheet over an area of 1 cm×2 cm to fabricate a negative electrode. A nickel hydroxide plate (1 cm×2 cm) was used as a positive electrode. The two electrodes, with a cellophane sheet interposed as a separator, were encased in a polyetylene bag (1.5 cm×3 cm) to fabricate a battery. The electrolyte was 1 cc of KOH at a concentration of 400 g/L. The amount of the copper nitrate to be added to water was varied at 0, 0.3, 0.6 or 1.2 g. Each of the batteries thus fabricated was measured for the discharge capacity and the charge-discharge cycle number. The results are shown in Table 1 below. The charge and discharging conditions were as follows: the charge or discharge current was 7 mA and the system was so set that it would start to discharge when charging was continued either to 1.8 V or for 10 hours.

TABLE 1

| Copper nitrate, g | Discharge capacity, mAh/g | Cycle number |
|---|---|---|
| 0 | 100 | 4 |
| 0.3 | 180 | 10 |
| 0.6 | 230 | 40 |
| 1.2 | 200 | 35 |

The data in the column of "cycle number" refer to the number of charge-discharge cycles that could be repeated before the discharge capacity dropped to 80% of the initial value.

Obviously, the comparative sample without the addition of copper nitrate had only poor performance in terms of discharge capacity and cycle number.

EXAMPLE 2

An experiment was performed as in Example 1, except that the copper nitrate was replaced by indium nitrate. The results are shown in Table 2.

TABLE 2

| Indium nitrate, g | Discharge capacity, mAh/g | Cycle number |
|---|---|---|
| 0 | 100 | 4 |
| 0.3 | 120 | 30 |
| 0.6 | 150 | 60 |
| 0.9 | 150 | 70 |
| 1.2 | 150 | 70 |

Obviously, the comparative sample without the addition of indium nitrate had only poor performance in terms of discharge capacity and cycle number.

EXAMPLE 3

An experiment was performed as in Example 1, except that solutions of indium nitrate and copper nitrate were added in that order to a slurry of zinc particles. The results are shown in Table 3.

TABLE 3

| Amount of addition, g | Discharge capacity, mAh/g | Cycle number |
|---|---|---|
| 0 | 100 | 4 |
| In nitrate (0.3 g) + Cu nitrate (0.6 g) | 230 | 70 |

Obviously, the addition of both indium and copper caused a significant improvement in both discharge capacity and cycle number over the comparative sample.

EXAMPLE 4

A zinc powder (16 g) having an average particle size of 7 μm was stirred with 1000 cc of water vigorously by a wet method, with 0.03 N nitric acid (500 cc) being added to etch the zinc particles. Thereafter, an aqueous solution of copper nitrate (1000 cc) was added by means of a metering pump in such amounts that the copper content would be 0.5, 1.0, 3.0 and 5.0% of the zinc powder. Subsequently, the zinc particles were coated with copper, dewatered, washed and vacuum dried at room temperature. The thus prepared coated zinc particles (50 parts) were mixed with zinc oxide (50 parts) and bound with PTFE (5 parts) to prepare an active material for a negative electrode, which was pasted to a punched copper sheet (3.5 cm×5.0 cm×0.15 mm) by means of a roll and a hydraulic press to make a negative electrode in a total thickness of 0.6 mm. Using this negative electrode, a battery was fabricated according to the cross section shown in FIG. 1. As shown, the negative electrode 5 space from a known nickel hydroxide positive electrode 2 by separator 3 consisting of cellophane sandwiched between nonwoven nylon fabrics was wound on itself and pressed into a cylindrical case 4 having a seal 1. The case 4 was filled with an electrolyte comprising an aqueous solution of 45% KOH saturated with zinc oxide and supplemented with 0.5% indium hydroxide. In this way, four samples of sealed alkaline zinc secondary battery having a nominal capacity of 500 mAh were fabricated.

The thus fabricated secondary batteries were subjected to a cycle test in the following manner: they were charged in an atmosphere at 20° C. at a charging current of 260 mA for 2 hours, then discharged to 1.0 V at 260 mA. The discharge capacity of each battery was measured at 50, 100, 150 and 200 cycles and recorded in Table 4.

TABLE 4

| | Discharge capacity, mAh | | | |
|---|---|---|---|---|
| | 50 cycles | 100 cycles | 150 cycles | 200 cycles |
| Cu coverage, % | | | | |
| 0.5 | 510 | 505 | 486 | 352 |
| 1.0 | 506 | 501 | 455 | 336 |
| 3.0 | 502 | 496 | 445 | 346 |
| 5.0 | 500 | 455 | 429 | 325 |
| In coverage, % | | | | |
| 0.5 | 506 | 502 | 487 | 370 |
| 1.0 | 501 | 497 | 482 | 365 |
| 3.0 | 485 | 482 | 427 | 359 |
| 5.0 | 507 | 498 | 435 | 324 |
| In/Cu coverage % | | | | |
| In   Cu | | | | |
| 1   3 | 493 | 489 | 436 | 352 |
| 1   5 | 500 | 476 | 455 | 345 |
| 3   3 | 493 | 489 | 436 | 352 |
| 3   5 | 492 | 468 | 428 | 342 |
| Comparison | 369 | 216 | 124 | — |

EXAMPLE 5

Indium coated zinc powders were prepared as in Example 4 by adding an aqueous solution of indium nitrate to zinc powders in such amounts that the indium coverage would be 0.5, 1.0, 3.0 and 5.0% on a weight basis. Sealed alkaline zinc batteries were fabricated as in Example 4 except for the use of the indium coated zinc powders. The discharge capacities of the fabricated batteries are also recorded in Table 4.

EXAMPLE 6

Zinc powders having both In and Cu coats were prepared by adding aqueous solutions of indium nitrate and copper nitrate in such a way that an indium coat which accounted for 1% of the zinc powder was overlaid with a 3% or 5% Cu coat or that an indium coat which accounted for 3% of the zinc powder was overlaid with a 3% or 5% Cu coat. Sealed alkaline zinc batteries were fabricated as in Example 4, except for the use of the In/Cu coated zinc powders. The discharge capacities of the fabricated batteries are also recorded in Table 4.

A zinc powder (50 parts) comprising uncoated particles of an average size of 7 μm was mixed with zinc oxide (50 parts) and PTFE (5 parts) and the mix was processed as in Example 4 to fabricate a comparative sample of sealed alkaline zinc battery. The discharge capacity of this battery is also recorded in Table 4.

Table 4 clearly shows that the sealed alkaline secondary batteries using a negative electrode made of the Cu and/or In coated zinc powder experienced a slower decrease in discharge capacity than the comparative sample as a result of repeated cycles. Thus, the invention products had a by far longer cycle life and a higher discharge efficiency than the conventional product.

EXAMPLE 7

Sixteen grams of a zinc powder having an average particle size of 7 μm as well as water (1000 cc) were stirred vigorously by a wet method, with 0.03 N nitric acid (500 cc) being added to etch the zinc particles. Thereafter, an aqueous solution of silver nitrate (1000 cc) was added by means of a metering pump in such amounts that the silver content would be 0.5, 1.0, 3.0 and 5.0% of the zinc powder. After coating with silver, the zinc particles were dewatered, washed and vacuum dried at room temperature. The thus prepared coated zinc particles (50 parts) were mixed with zinc oxide (50 parts) and bound with PTFE (5 parts) to prepare an active material for a negative electrode, which was pasted to a punched copper sheet (3.5 cm×5.0 cm×0.15 mm) by means of a roll and a hydraulic press to make a negative electrode in a total thickness of 0.6 mm.

This negative electrode, as spaced from a known sintered nickel hydroxide cathode by a separator consisting of cellophane sandwiched between nonwoven nylon fabrics was wound on itself and pressed into a cylindrical case, which was filled with an electrolyte comprising an aqueous solution of 45% KOH saturated with zinc oxide and supplemented with 0.5% indium hydroxide. In this way, four samples of sealed alkaline zinc secondary battery having a nominal capacity of 500 mAh were fabricated.

The thus fabricated secondary batteries were subjected to a cycle test in the following manner; they were charged in an atmosphere at 20° C. at a charging current of 260 mA for 2 hours, then discharged to 1.0 V at 260 mA. The discharge capacity of each battery was measured at 50, 100, 150 and 200 cycles and recorded in Table 5.

TABLE 5

| | Discharge capacity, mAh | | | |
|---|---|---|---|---|
| | 50 cycles | 100 cycles | 150 cycles | 200 cycles |
| Ag coverage, % | | | | |
| 0.5 | 510 | 488 | 446 | 386 |
| 1.0 | 498 | 489 | 465 | 397 |
| 3.0 | 499 | 492 | 479 | 346 |
| 5.0 | 459 | 456 | 437 | 373 |
| Comparison | 369 | 216 | 124 | — |

A zinc powder (50 parts) comprising uncoated particles of an average size of 7 μm was mixed with zinc oxide (50 parts) and PTFE (5 parts) and the mix was processed as in Example 7 to fabricate a comparative sample of sealed alkaline zinc battery. The discharge capacity of this battery is also recorded in Table 5.

Table 5 clearly shows that the sealed alkaline secondary batteries using a negative electrode made of the Ag coated Zn powder experienced a slower decrease in discharge capacity than the comparative sample as a result of repeated cycles. Obviously, the invention products had a by far a longer cycle life and a higher discharge efficiency than the conventional product.

The zinc powder of the invention for use in a battery is characterized in that copper and silver which are good conductors are effectively dispersed in the active material zinc to facilitate charge transfer to the zinc; as a result, the cell reactions become uniform enough to improve the discharge capacity and the cycle characteristics, contributing to the manufacture of high-performance alkaline zinc secondary batteries at low cost.

What is claimed is:

1. A zinc powder for use in batteries which comprises zinc particles having surfaces and which have a part or all of the particle surfaces coated either with indium and copper, or with copper, or with silver.

2. The zinc powder for use in batteries according to claim 1, which consists essentially of the zinc particles having part or all of the particle surfaces thereof coated with copper in an amount of 0.5–10 wt % based on the amount of zinc.

3. The zinc powder for use in batteries according to claim 1 which consists essentially of the zinc particles having part or all of the particle surfaces thereof coated with indium and copper, the indium being in an amount of 0.5–5 wt % based on the amount of zinc, and the copper being in an amount of 0.5–5 wt % based on the amount of zinc.

4. The zinc powder for use in batteries according to claim 3 wherein the ratio of In to Cu is 1:0.1–10.

5. The zinc powder for use in batteries according to claim 4 wherein the ratio of In to Cu is 1:1–10.

6. The zinc powder for use in batteries according to claim 5 wherein the ratio of In to Cu is 1:1–5.

7. The zinc powder for use in batteries according to claim 1 which consists essentially of the zinc particles having part or all of the particle surfaces coated with silver in an amount of 0.5–5 wt % based on the amount of zinc.

8. A secondary alkaline zinc battery which comprises a negative electrode, a positive electrode and an electrolyte including an active material comprising a zinc powder which, comprises zinc particles having surfaces and which have a part or all of the particle surfaces coated either with indium and copper, or with copper, or with silver.

9. The secondary alkaline zinc battery according to claim 8, wherein the electrolyte is an alkaline electrolyte containing an indium compound.

10. The zinc powder for use in batteries according to claim 9, wherein the indium compound is selected from the group consisting of indium hydroxide, indium oxide and indium fluoride.

11. The secondary alkaline zinc battery according to claim 8, wherein the positive electrode is a nickel hydroxide plate.

12. The secondary alkaline zinc battery according to claim 11, wherein the electrolyte comprises KOH.

13. A battery material comprising as a main component solids produced by suspending a zinc containing powder having particles of zinc in a solution containing either copper and indium ions, or copper ions, or silver ions to coat the surface of each particle of zinc with indium and copper, or with copper or with silver and then subjecting the resultant suspension to a solid-liquid separation.

14. A secondary alkaline zinc battery which comprises a negative electrode, a positive electrode and an electrolyte, the negative electrode including an anode active material having a solids content which is produced by suspending a zinc-containing powder having particles of zinc in a solution containing either copper and indium ions, or copper ions, or silver ions to coat the surface of each particle of zinc with indium and copper, or with copper, or with silver and then subjecting the resultant suspension to a solid-liquid separation.

15. The secondary alkaline zinc battery according to claim 14, wherein the electrolyte is an alkaline electrolyte containing an indium compound.

16. The zinc powder for use in batteries according to claim 15, wherein the indium compound is selected from the group consisting of indium hydroxide, indium oxide and indium fluoride.

* * * * *